US006483499B1

(12) United States Patent
Li et al.

(10) Patent No.: US 6,483,499 B1
(45) Date of Patent: Nov. 19, 2002

(54) 3D SCULPTURING INPUT DEVICE

(75) Inventors: Li Man Li, Kowloon (HK); Derek Louie, Kowloon (HK); Chi Hong Chan, Kowloon (HK)

(73) Assignee: Hong Kong Productivity Council, Kowloon (HK)

( * ) Notice: Subject to any disclaimer, the term of this patent is extended or adjusted under 35 U.S.C. 154(b) by 0 days.

(21) Appl. No.: 09/553,758

(22) Filed: Apr. 21, 2000

(51) Int. Cl.$^7$ ................................. G09G 5/00
(52) U.S. Cl. ..................... 345/179; 340/32; 345/156
(58) Field of Search ................. 345/179, 156, 345/1, 441; 341/20, 32; 395/119; 700/264

(56) References Cited

U.S. PATENT DOCUMENTS

| | | | | |
|---|---|---|---|---|
| 5,214,428 A | * | 5/1993 | Allen | 341/20 |
| 5,237,647 A | * | 8/1993 | Roberts et al. | 395/119 |
| 5,420,607 A | * | 5/1995 | Miller et al. | 345/156 |
| 5,666,473 A | * | 9/1997 | Wallace | 345/420 |
| 5,825,308 A | * | 10/1998 | Rosenberg | 341/20 |
| 6,040,840 A1 | * | 3/2001 | Koshiba et al. | 345/441 |
| 6,211,848 B1 | * | 4/2001 | Plesniak et al. | 345/1 |
| RE37,528 E | * | 1/2002 | Hannaford et al. | 700/264 |

OTHER PUBLICATIONS

Berkelman, Peter; Butler, Zack; Hollis, Ralph; "Design of a Hemispherical Magnetic Levitation Haptic Interface Device"; 1996 ASME Int. Mechanical Engr. Congress & Expo, Atlanta, Nov. 1996, DSC–vol. 58 pp. 483–488.*

* cited by examiner

Primary Examiner—Steven Saras
Assistant Examiner—Srilakshmi K. Kumar
(74) Attorney, Agent, or Firm—Leydig, Voit & Mayer, Ltd.

(57) ABSTRACT

A sculpturing input device for computerized 3D sculpturing includes a base for connection to a computer loaded with a virtual engraving program, and a magnetic stylus for use with the base for controlling a virtual engraving tool to cut a virtual object of the program. An optical position measuring system is provided in the base for measuring the position and direction of the stylus relative to the base, and determining the position and direction of the tool relative to the object. A magnetic force feedback system is provided in the base for exerting a magnetic resistive force upon the stylus when the tool cuts into the object, thereby simulating a counteracting resistive force of the object being cut.

12 Claims, 3 Drawing Sheets

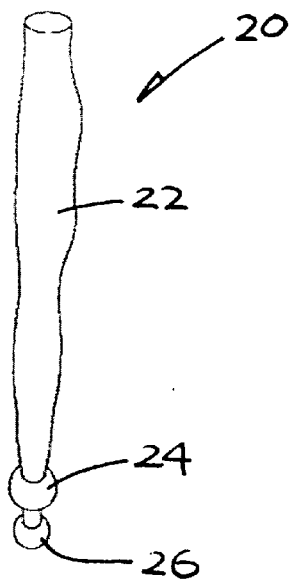
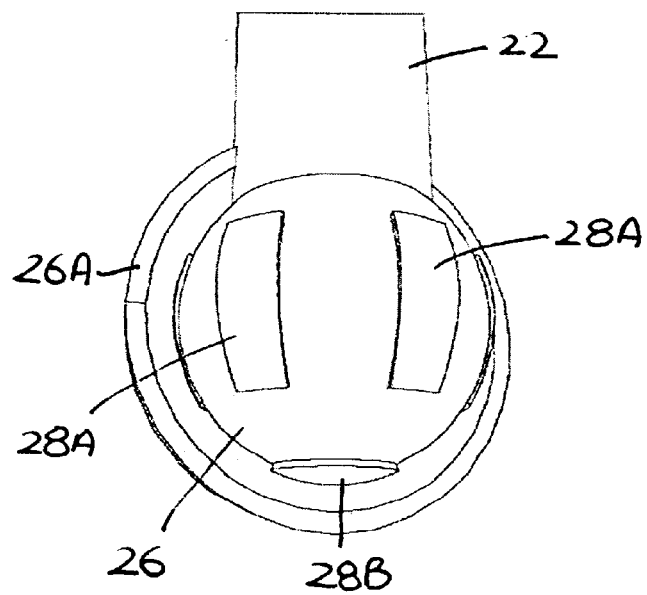
FIG. 3                    FIG. 4
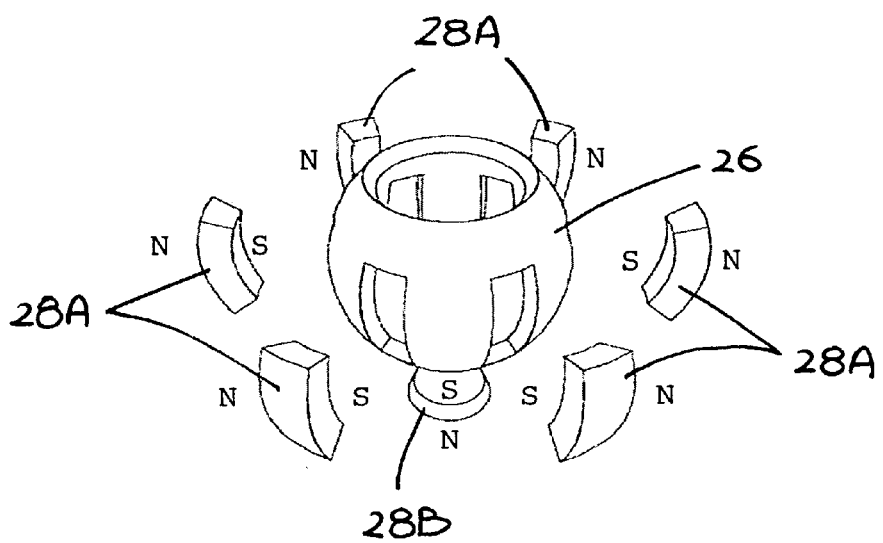
FIG. 5

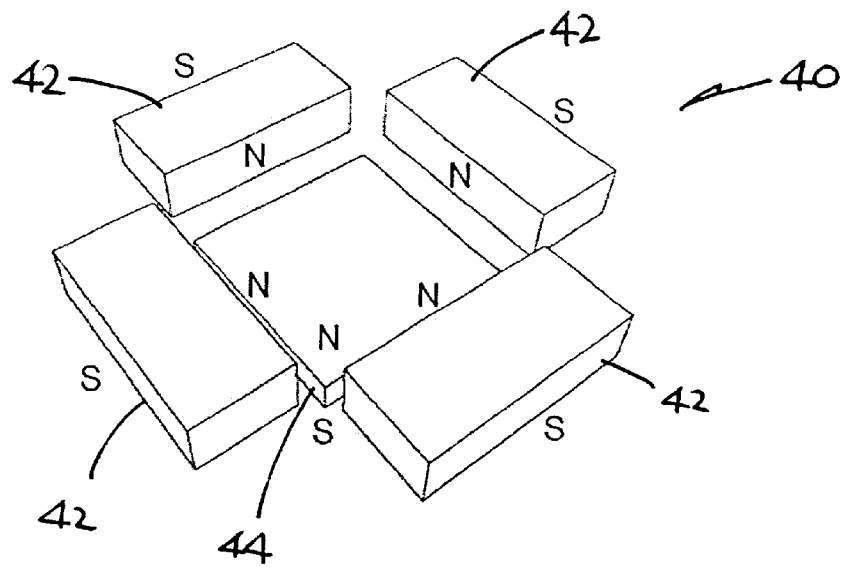
FIG. 8
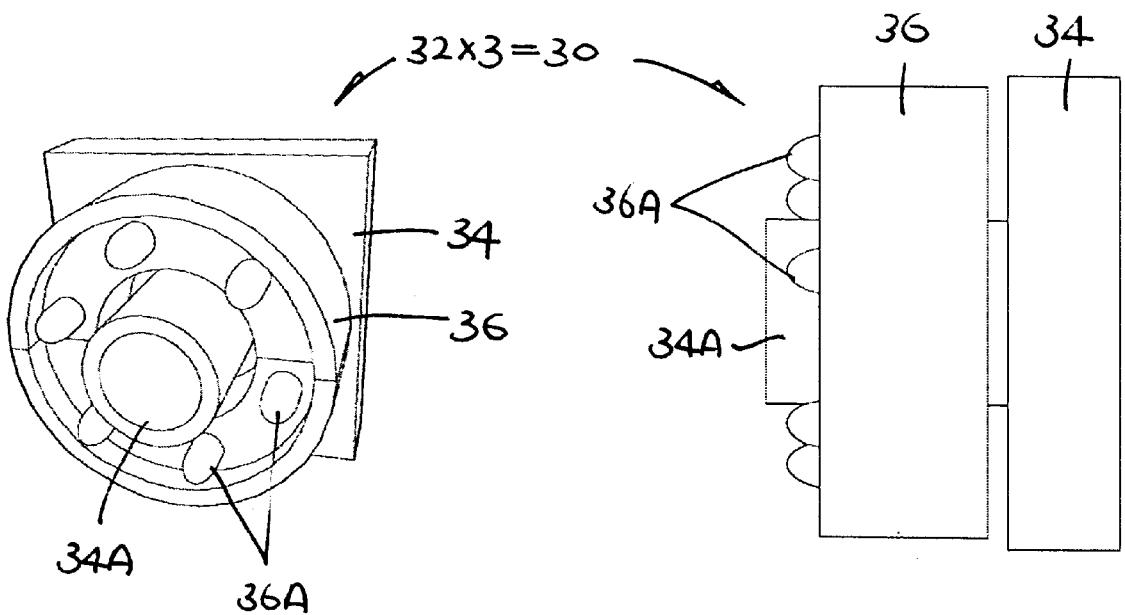
FIG. 6
FIG. 7

US 6,483,499 B1

3D SCULPTURING INPUT DEVICE

The present invention relates to a 3D (three-dimensional) sculpturing input device for computerised 3D sculpturing.

BACKGROUND OF THE INVENTION

Traditionally, while engraving a clay model using an engraving tool, the artist is able to feel the resistance of the clay material against cutting, in that the deeper the cut into the clay material is, the larger the resistive force is. Nowadays, sculpturing may also be performed by means of a computer, but the sense of the counteracting force against cutting is not available.

The invention seeks to provide a 3D sculpturing input device for computerized 3D sculpturing, which is capable of providing a sculptor with a feel of the cutting counteracting force.

SUMMARY OF THE INVENTION

According to the invention, there is provided a sculpturing input device for computerized 3D sculpturing, which device comprises a base for connection to a computer installed with a virtual engraving program, a magnetic stylus for use with the base for controlling a virtual engraving tool to cut a virtual object of the program, an optical position measuring system provided at the base for measuring the position and direction of the stylus relative to the base, said position and direction determining the position and direction of said tool relative to said object, and a magnetic force feedback system provided at the base for exerting a magnetic resistive force upon the stylus when said tool cuts into said object, thereby simulating a counteracting resistive force of said object being cut.

It is preferred that the stylus have a magnetic tip, the tip having a series of two visually distinct parts along the tip.

More preferably, the two parts are both substantially spherical but have different sizes.

More preferably, the two parts are coated with fluorescent material.

In a preferred embodiment, the base has a generally flat body having a recess in which the stylus is to be used, and the optical position measuring system and the magnetic force feedback system are provided on at least one side of the recess.

More preferably, the optical position measuring system includes at least two image sensing units located to face the recess at intercepting angles and cover substantially the entire space of the recess. face the recess at intercepting angles and cover substantially the entire space of the recess.

Further more preferably, each image sensing unit is formed by a camera and an adjacent infra red signal emitter.

Further more preferably, the camera has a lens, and the infra red signal emitter has an annular arrangement of infra red light emitting diodes disposed around the lens, said lens and light emitting diodes pointing in the same direction forwards.

In a preferred embodiment, the magnetic force feedback system includes a plurality of electro-magnets located around the recess and underneath the recess.

More preferably, the electro-magnets are electronically controlled to provide a magnetic force of an increasing strength in an interactive manner when said engraving tool is cutting deeper into said object, for simulating the counteracting resistive force of a physical object being cut.

BRIEF DESCRIPTION OF DRAWINGS

The invention will now be more particularly described, by way of example only, with reference to the accompanying drawings, in which:

FIG. 3 is a perspective view of the stylus of FIG. 1;

FIG. 4 is an enlarged perspective view showing the internal construction of the tip of the stylus of FIG. 3;

FIG. 5 is an exposed perspective view of the stylus tip of FIG. 4;

FIG. 6 is an enlarged perspective view of one of the position sensors of FIG. 2;

FIG. 7 is a side view of the position sensor of FIG. 6; and

FIG. 8 is a perspective view of the electro-magnets of FIG. 2.

DETAILED DESCRIPTION OF PREFERRED EMBODIMENT

Figure 1:
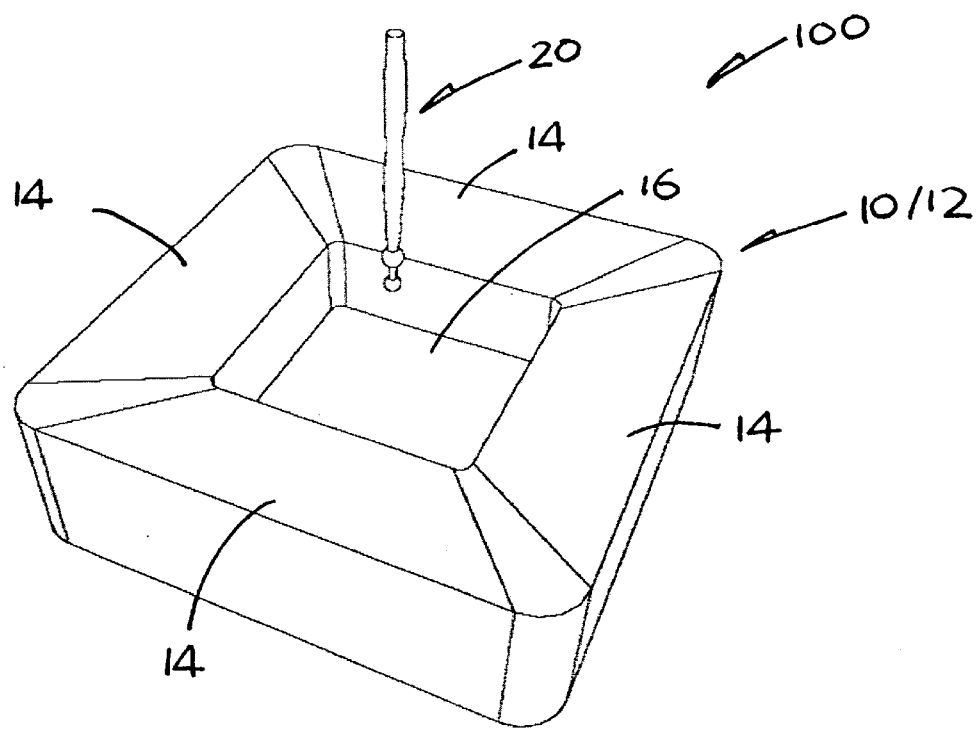
FIG. 1 is a perspective view of an embodiment of a 3D sculpturing input device in accordance with the invention.
Figure 2:
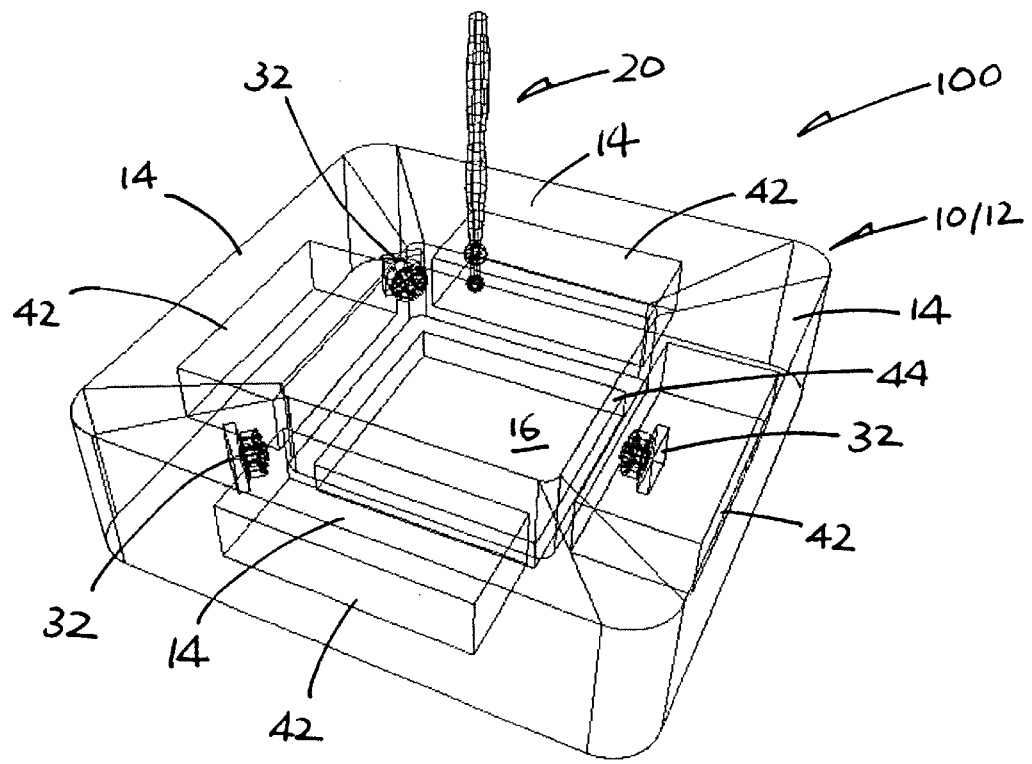
FIG. 2 is a wire frame perspective view of the input device of FIG. 1, showing the use of electro-magnets and position sensors in the base.

Referring to the drawings, there is shown a 3D sculpturing input device 10 embodying the invention, which device 100 comprises a base 10 for connection to a computer installed with a virtual engraving program and a magnetic stylus 20 for use with the base 10 for controlling a virtual engraving tool of the program. The base 10 has a generally flat square body 12 having four sides 14 and a square central recess 16 therein. The input device 100 includes an optical position measuring system 30 and a magnetic force feedback system 40, both being provided in the base 10.

The magnetic stylus 20 has a pen-like body 22 and includes a series of two spheres 24 and 26 at the tip (lower end) of the body 22. The two spheres 24 and 26 are visually distinct from each other in terms of size, and are spaced for about 10 mm apart along the tip. Each sphere 24/26 is provided with a coating 24A/26A of a fluorescent material, such as phosphorus, which is capable of glowing (at an increased light intensity) upon illumination by an infra red beam of the optical position measuring system 30. The lower sphere. 26 is relatively smaller than the upper sphere 24, said size difference being visually indicative of the upward/downward direction or angular position of the stylus 20.

The lower sphere 26 is provided, underneath its coating 26A, with six arcuate permanent magnets 28A at equi-angular upright positions around the sphere 26 and a central disc-like permanent magnet 28B at the lowermost end of the sphere 26. Each magnet. 28A/28B has a north pole facing outwards and a south pole facing inwards. As a result, the outer surface of the sphere 26 has a north pole in general, which is capable of interacting with magnetic force feedback system 40 to induce a repellant magnetic force upon the stylus 20.

The optical position measuring system 30 includes three image sensing units 32. Each image sensing unit 32 includes a camera 34 having a lens 34A and an infra red signal emitter 36 having an annular arrangement of six infra red light emitting diodes 36A disposed around the lens 34A. The lens 34A and the light emitting diodes 36A point in the same direction, i.e., forwards.

The three image sensing units 32 are located, at the same height level but at different locations, within the sides 14 of the base 10 and are arranged to aim at the center of the base recess 16 at intercepting angles. Two of the image sensing units 32 are positioned at respective adjacent inner corners at opposite ends of one base side 14, and the remaining unit 32 is positioned at the center of the base side 14 directly opposite to said one base side 14. The magnetic force feedback system 40 includes a set of four identical electro-magnets 42 which are located at the same height level within the respective sides 14 of the base 10, and includes a fifth electromagnet 44 which is located centrally and immediately underneath the recess 16 at a height level lower than that of the electro-magnets 42. The electro-magnets 42 are rectangular and extend along substantially the entire length of the four sides of the base recess 16. The other electromagnet 44 is square and occupies substantially the entire footprint of the base recess 16. The electro-magnets 42 and 44 have inner surfaces facing the base recess 16 as a north pole (the same polarity as the tip of the stylus 20), and their polarity and, in particular, magnetic strength are electronically controllable.

The optical position measuring system 30 is designed to track the position and movement of the tip of the stylus 20 by means of the three image sensing units 32. Each infra red signal emitter 36 emits infra red beams in all direction to cover the entire space of the base recess 16 for causing the phosphorus-coated spheres 24 and 26 of the stylus 20 to glow, and the associated camera 34 captures the resulting glowing images. The image picked up by each camera 34 is processed to filter out unwanted signals such that the two spheres 24 and 26 can be identified based on the difference in light intensity between the spheres 24 and 26 and their surrounding or background.

The co-ordinates of the image of the two spheres 24 and 26 are then mapped to a calibration table of the virtual engraving program, whereby the 2D (two-dimensional) physical position of the spheres 24 and 26 relative to each specific camera 34 can be detected. The three cameras 34 provide their own sets of 2D relative positions of the spheres 24 and 26 taken from different locations, and these data are then analyzed to calculate the "absolute" 3D position of the two spheres 24 and 26 relative to the base 10. Accordingly, at any time, the movement of the tip of the stylus 20 can be tracked, with its position and movement precisely determined.

The virtual engraving program accepts the data pertaining to the movement of the stylus 20, and in particular its tip, relative to the base 10 for controlling the virtual engraving tool to perform virtual 3D sculpturing on a virtual object such as a virtual clay model.

The magnetic force feedback system 40 is designed to apply a physical repellent magnetic force to the tip of the stylus 20 by means of the electro-magnets 42 and 44. The magnitude of the magnetic force is being controlled electronically, according to the position of the virtual engraving tool (or the stylus 20) relative to the virtual clay model (or the base 10 in general), so as to generate a feedback resistive force exerted on the stylus 20 to create the illusion of it cutting into a physical object. When the virtual engraving tool is stationary or does not touch the virtual clay model, the magnetic force is set to be very weak (practical zero) such that the stylus 20 is free to move. When the virtual engraving tool touches or cuts into the virtual clay model, the magnetic force is set to an increasing strength in an interactive manner for simulating the counteracting resistive force of a physical clay model. As a result, the sculptor can feel the resistive force exerted on the tip of the stylus 20 as a feedback, as if he is engraving a physical clay model.

For example, a user intends to manoeuvre the virtual engraving tool to cut a slot in the virtual clay model, and initially he needs to lower the stylus 20 vertically. When the engraving tool touches the clay model, the magnetic field strength of the bottom electromagnet 44 will be increased to a noticeable level in order to generate an upward resistive force, whereas the side electro-magnets 42 is not responding. When the user continues to move the stylus 20 downwards to start cutting, the magnetic field strength of the bottom electromagnet 44 will become increasingly stronger as the engraving tool is cutting deeper into the clay model. If the user moves the stylus 20 horizontally towards the right hand side, the magnetic field strength of the electro-magnet 42 on that side will now be set to an increasingly stronger level, whereas all the other electro-magnets 42 and 44 remain idle. If the user moves the stylus 20 at an angle, the corresponding electro-magnets 42/44 will react accordingly.

The input device 100 is designed particularly for computerized 3D modeling, with the simulation of a feedback resistive force similar to that in the case of traditional engraving of a physical object. The input device 100 is useful for an artist to create a 3D digital sculpture in a computer, in a manner which does not only simulate the traditional approach of using a physical engraving tool and clay model but is more versatile and flexible. The learning curve can thus be greatly shortened and everybody can use this input device 100 without prolonged training.

The invention has been given by way of example only, and various modifications of and/or alterations to the described embodiment may be made by persons skilled in the art without departing from the scope of the invention as specified in the appended claims.

What is claimed is:

1. A sculpturing input device for computerized 3D sculpturing comprising:

a base for connection to a computer loaded with a virtual engraving program;

a magnetic stylus used with the base for controlling a virtual engraving tool to cut a virtual object established by the program;

an optical position measuring system located at the base for measuring position and direction of the stylus relative to the base, and position and direction of the tool relative to the object; and a magnetic force feedback system located at the base for exerting a magnetic resistive force upon the stylus when the tool cuts into the object, thereby simulating a counteracting resistive force of the object being cut, wherein the base has a generally flat body having a recess in which the stylus is used, the optical position measuring system and the magnetic force feedback system are located on at least one side of the recess, the optical position measuring system includes at least two image sensing units facing the recess at intersecting angles and covering substantially all of the recess, and each image sensing unit includes a camera and an adjacent infra red signal emitter.

2. The sculpturing input device as claimed in claim 1, wherein the stylus has a magnetic tip, and two visually distinct parts along the tip.

3. The sculpturing input device as claimed in claim 2, wherein the two parts are substantially spherical and have different sizes.

4. The sculpturing input device as claimed in claim 2, wherein the two parts are coated with fluorescent material.

5. The sculpturing input device as claimed in claim 1, wherein the camera has a lens, and the infra red signal emitter has an annular arrangement of infra red light emitting diodes disposed around the lens, the lens and light emitting diodes pointing in a forward direction.

6. The sculpturing input device as claimed in claim 1, wherein the magnetic force feedback system includes a plurality of electro-magnets located around the recess and underneath the recess.

7. The sculpturing input device as claimed in claim 6, wherein the electro-magnets are electronically controlled to provide a magnetic force of an increasing strength in an interactive manner when the engraving tool is cutting deeper into the object, for simulating a counteracting resistive force of a physical object being cut.

8. A sculpturing input device for computerized 3D sculpturing comprising:
   a base for connection to a computer loaded with a virtual engraving program;
   a magnetic stylus used with the base for controlling a virtual engraving tool to cut a virtual object established by the program;
   an optical position measuring system located at the base for measuring position and direction of the stylus relative to the base, and position and direction of the tool relative to the object; and
   a magnetic force feedback system located at the base for exerting a magnetic resistive force upon the stylus when the tool cuts into the object, thereby simulating a counteracting resistive force of the object being cut, wherein
   the base has a generally flat body having a recess in which the stylus is used,
   the optical position measuring system and the magnetic force feedback system are located on at least one side of the recess, and
   the magnetic force feedback system includes a plurality of electro-magnets located around the recess and underneath the recess.

9. The sculpturing input device as claimed in claim 8, wherein the electro-magnets are electronically controlled to provide a magnetic force of an increasing strength in an interactive manner when the engraving tool is cutting deeper into the object, for simulating a counteracting resistive force of a physical object being cut.

10. The sculpturing input device as claimed in claim 8, wherein the stylus has a magnetic tip, and two visually distinct parts along the tip.

11. The sculpturing input device as claimed in claim 10, wherein the two parts are substantially spherical and have different sizes.

12. The sculpturing input device as claimed in claim 10, wherein the two parts are coated with fluorescent material.

* * * * *